United States Patent [19]
Koch

[11] Patent Number: 4,607,996
[45] Date of Patent: Aug. 26, 1986

[54] LATERAL TRANSPORT TRAILER

[75] Inventor: Earl E. Koch, Mohnton, Pa.

[73] Assignee: New Holland Inc., New Holland, Pa.

[21] Appl. No.: 685,629

[22] Filed: Dec. 24, 1984

[51] Int. Cl.$^4$ .................................. B65G 67/02
[52] U.S. Cl. ............................. 414/537; 14/71.1; 410/4; 414/921
[58] Field of Search .............. 414/537, 538, 921, 430, 414/462, 519, 571; 410/2, 3, 4, 6, 27, 28, 29, 29.1; 187/8.65, 8.77, 8.52; 105/436; 14/71.1, 71.5; 296/61

[56] References Cited

U.S. PATENT DOCUMENTS

| | | | |
|---|---|---|---|
| 2,350,118 | 5/1944 | Knapp | 414/537 X |
| 2,414,383 | 1/1947 | Merriam | 414/430 |
| 2,608,312 | 8/1952 | Day | 414/430 |
| 3,204,791 | 9/1965 | Williams | 296/61 X |
| 4,088,235 | 5/1978 | Thacker | 414/537 |
| 4,127,202 | 11/1978 | Jennings et al. | 414/537 |
| 4,155,678 | 5/1979 | Lehman et al. | 410/3 X |
| 4,465,421 | 8/1984 | Murillo | 414/430 |
| 4,558,560 | 12/1985 | Koch | 56/228 |

Primary Examiner—Robert J. Spar
Assistant Examiner—Stuart J. Millman
Attorney, Agent, or Firm—Larry W. Miller; Frank A. Seemar; Darrell F. Marquette

[57] ABSTRACT

A trailer for use in transporting a harvesting machine having a laterally shiftable tongue is disclosed wherein the trailer has transversely extending loading ramps pivotally connected to the load platform of the trailer to permit the harvester to be elevated from the ground level onto the load platform. An elevating linkage interconnecting the load platform and the pivotably ramps is engageable with the harvester wheels to affect a raising of the load ramps when the harvester has been properly positioned on the trailer platform. The load ramps are articulated to compact the transport position of the load ramps, thereby minimizing the transport width of the loaded trailer. The draft connection between the loaded trailer and its prime mover is the laterally shiftable tongue of the harvester positioned on the trailer platform.

4 Claims, 7 Drawing Figures

LATERAL TRANSPORT TRAILER

BACKGROUND OF THE INVENTION

The present invention relates generally to crop harvesting machines having a laterally shiftable tongue and, more particularly, to a transport trailer for transporting the harvester in a lateral orientation to minimize transport width.

Generally, harvesting equipment, particularly hay harvesting equipment, has been manufactured with a transverse width that would permit transport thereof over the highway and through farm gates rearwardly of its prime mover. Although the hay harvesting machines commonly referred to as pivot tongue windrowers, such as the type shown in U.S. Pat. No. 4,081,946 granted on April 4, 1978, to Philip J. Ehrhart, were generally wider in a transverse direction than previous pull-type hay harvesting machines, the centrally mounted pivoted drawbar permitted a towing of the harvester directly behind the prime mover in a centrally located position and, therefore, transport of the harvester in a normal orientation was not prohibited.

However, increasing transverse widths of such harvesting machine prefers the harvester from being towed over the highway and through restrictive openings behind the prime mover in a normal orientation, necessitating the provision of alternate means of transporting the harvester. Two methods of transporting agricultural implements in a transverse orientation, which narrows overall transport width because of the longitudinal length of the machines is less than its transport width, can be seen in U.S. Pat. Nos. 3,962,853 and 3,721,461. Such apparatus requires a movement of wheels, hitches, jacks, etc. to equip the harvester for movement in a transverse direction, including the disconnection and reconnection of appropriate hitches in the prime mover.

The provision of a pivot tongue harvester with a laterally extendible drawbar, as disclosed in Applicant's copending U.S. patent application Ser. No. 652,365, filed Sept. 19, 1984, U.S. Pat. No. 4,558,560, permits the harvester to be mounted on the trailer, permitting a transportion of the harvester in a lateral orientation by utilizing the drawbar of the harvester as the hitch connection. Such a trailer utilizes transversely extending load ramps to permit the harvester to be elevated from the ground onto the load platform of the trailer. It would be desirable to provide a means for raising these load ramps to a transport position when the harvester has been properly positioned on the platform of the trailer without requiring additional operator input.

SUMMARY OF THE INVENTION

It is object of this invention to overcome the aforementioned disadvantages of the prior art by providing a lateral transport trailer having load ramps pivotally connected to the load platform and an elevating linkage engageable with the wheels of the harvester to pivotally move the load ramps into a transport position when the harvester has been properly positioned on the load platform.

It is a feature of this invention to provide articulated load ramps to permit a compact positioning of the load ramps when moved into a transport position.

It is an advantage of this invention that the load ramps for a lateral transport trailer are raised into a transport position without operator input.

It is another object of this invention to provide an elevating linkage mounted on the load platform adjacent the transverse end opposite the load ramps to permit engagement with the harvester wheels when properly positioned on the load platform.

It is another advantage of this invention that the transport width of the loaded transport trailer is minimized for over-the-highway transport.

It is another feature of this invention that the elevating linkage pivotally interconnects the load bed and the elevating ramps to affect a pivotal movement of the elevating ramps from a ground engaging position to a transport position when the harvester tire engages the linkage.

It is still another object of this invention to provide a lateral transport trailer for transporting a harvesting machine in a transverse orientation which is durable in construction, inexpensive of manufacture, carefree of maintenance, facile in assemblage, and simple and effective in use.

These and other objects, features and advantages are accomplished according to the instant invention by providing a trailer for use in transporting a harvesting machine having a laterally shiftable tongue wherein the trailer has transversely extending loading ramps pivotably connected to the load platform of the trailer to permit the harvester to be elevated from the ground level onto the load platform. An elevating linkage interconnecting the load platform and the pivotably ramps is engageable with the harvester wheels to affect a raising of the load ramps when the harvester has been properly positioned on the trailer platform. The load ramps are articulated to compact the transport position of the load ramps, thereby minimizing the transport width of the loaded trailer. The draft connection between the loaded trailer and its prime mover is the laterally shiftable tongue of the harvester positioned on the trailer platform.

BRIEF DESCRIPTION OF THE DRAWINGS

The advantages of this invention will become apparent upon consideration of the following detailed disclosure of the invention, especially when taken in conjunction with the accompanying drawings wherein.

DETAILED DESCRIPTION OF THE PREFERRED EMBODIMENT

Figure 1:
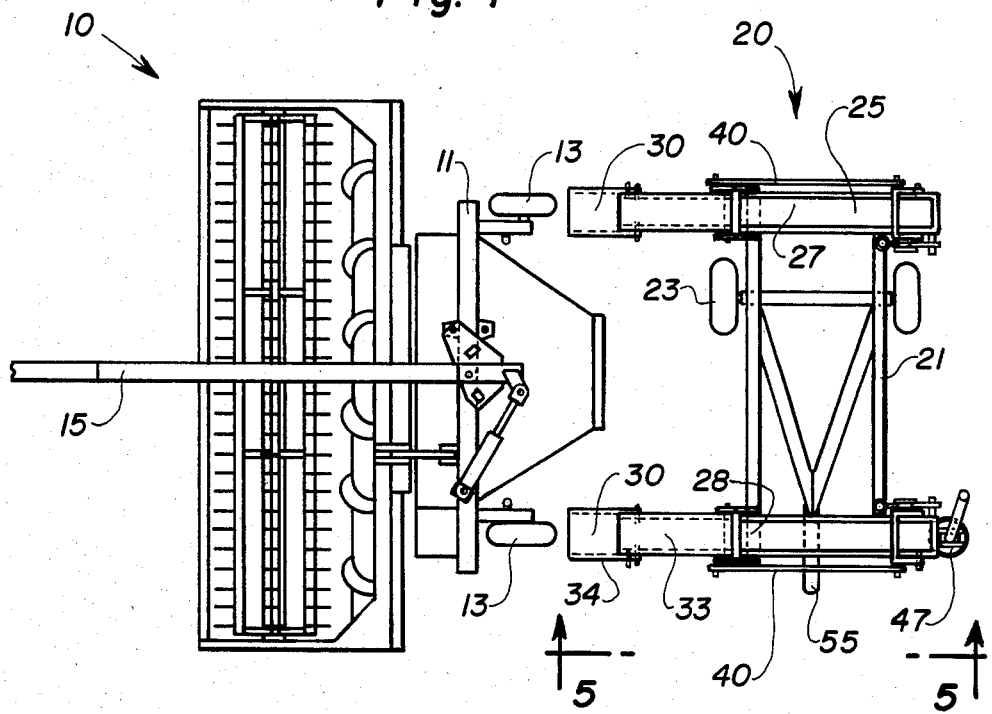
FIG. 1 is a top plan view of the transport trailer incorporating the principles of the instant invention, the harvesting machine being attached to the prime mover and positioned to be loaded onto the trailer.
Figure 2:
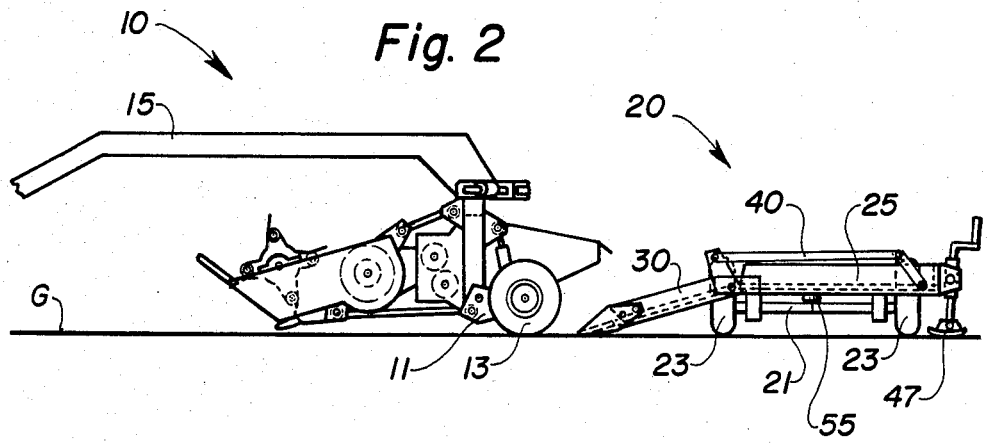
FIG. 2 is a side elevational view of the transport trailer and harvesting machine seen in FIG. 1, the elevating ramps being shown in a ground engaging position to permit an elevation of the harvester on the ground to the load platform of the trailer.

Referring now to the drawings and, particularly, to FIGS. 1 and 2, a lateral transport trailer for transporting a hay harvesting machine, commonly referred to as a pivot tongue mower-conditioner, can be seen. Any left and right references are used as a matter of convenience and are determined by standing at the rear of the respective machine, facing the longitudinally spaced forward end, the direction of travel during operation of the machine. Because of the lateral transport relationship of the harvester 10 with respect to the trailer 20, the side elevational view referred to in FIG. 1 depicts a side elevational view of the harvester 10 and a rear elevational view of the trailer 20. The harvester 10 is provided with a frame 11 mobilely supported over the ground G by transversely spaced wheels 13. The drawbar or tongue 15 is pivotally connected to the frame 11 and is positionable in a laterally extending position as described in greater detail in Applicant's co-pending U.S. patent application Ser. No. 652,365, U.S. Pat. No. 4,558,560, the contents of which are incorporated herein by reference.

Figure 5:
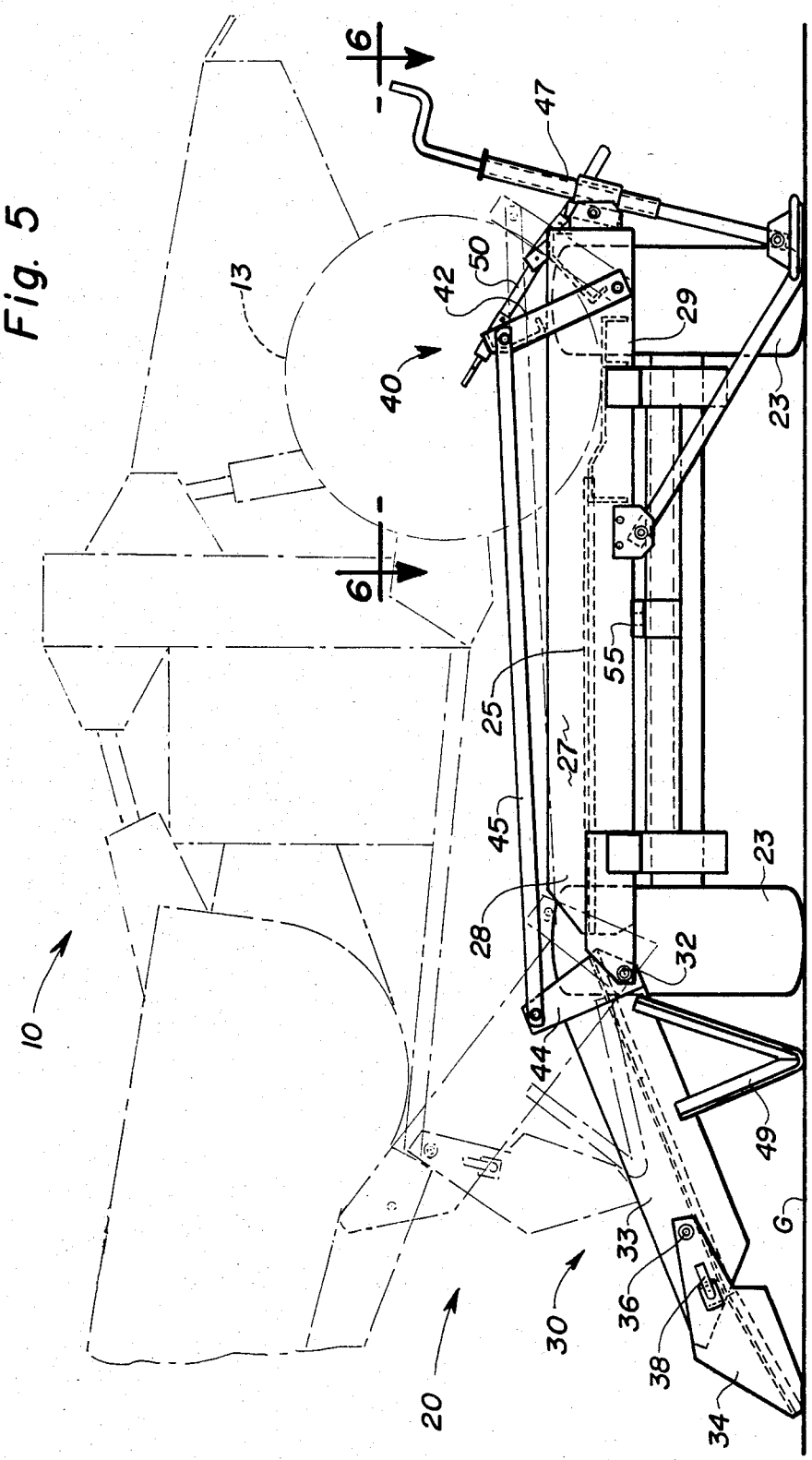
FIG. 5 is an enlarged rear elevational view of the lateral transport trailer corresponding to lines 5—5 of FIG. 1, the position of a harvester loaded thereon being shown in phantom.

The lateral transport trailer 20 includes a frame 21 mobilely supported over the ground G by spaced apart wheels 23. Although the trailer 20 is shown with two wheels 23, the trailer 20 could also be provided with multiple sets of wheels 23. Referring now to FIGS. 1, 2 and 5, it can be seen that the load platform 25 includes a pair of longitudinally spaced members 27 positioned in a lateral orientation to receive and support the wheels 13 of the harvester 10 above the ground G.

Figure 4:
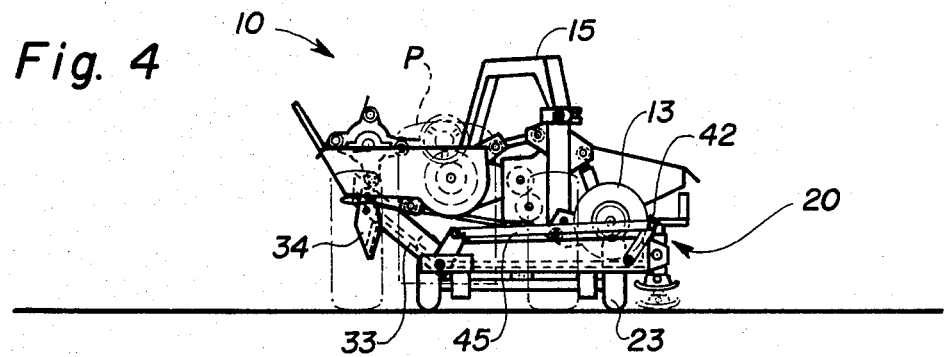
FIG. 4 is a rear elevational view of the loaded transport trailer seen in FIG. 3, the articulated elevating ramps being moved into a compact transport position by the elevating linkage.

An elevating ramp 30 is pivotally connected to one transverse end 28 of each member 27 of the load platform 25 for generally vertical movement about a pivot axis 32. Each elevating ramp 30 is constructed of an upper portion 33 pivotally connected to the corresponding member 27 and an articulated lower portion 34 pivotable about an articulation axis 36 to form the compact arrangement seen in FIG. 4. A locking mechanism 38 selectively restricts the articulation of the lower portion 34 relative to the upper portion 33.

Figure 6:
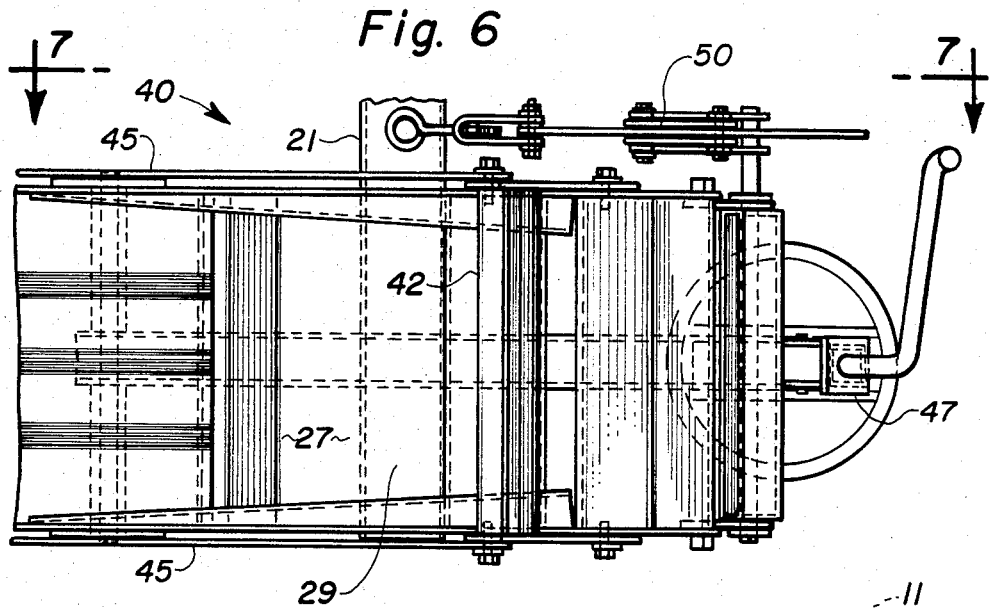
FIG. 6 is an enlarged top plan view of a portion of the load platform of the trailer showing the elevating linkage engageable with the wheel of the harvester to affect a pivotal movement of the elevating ramps.
Figure 7:
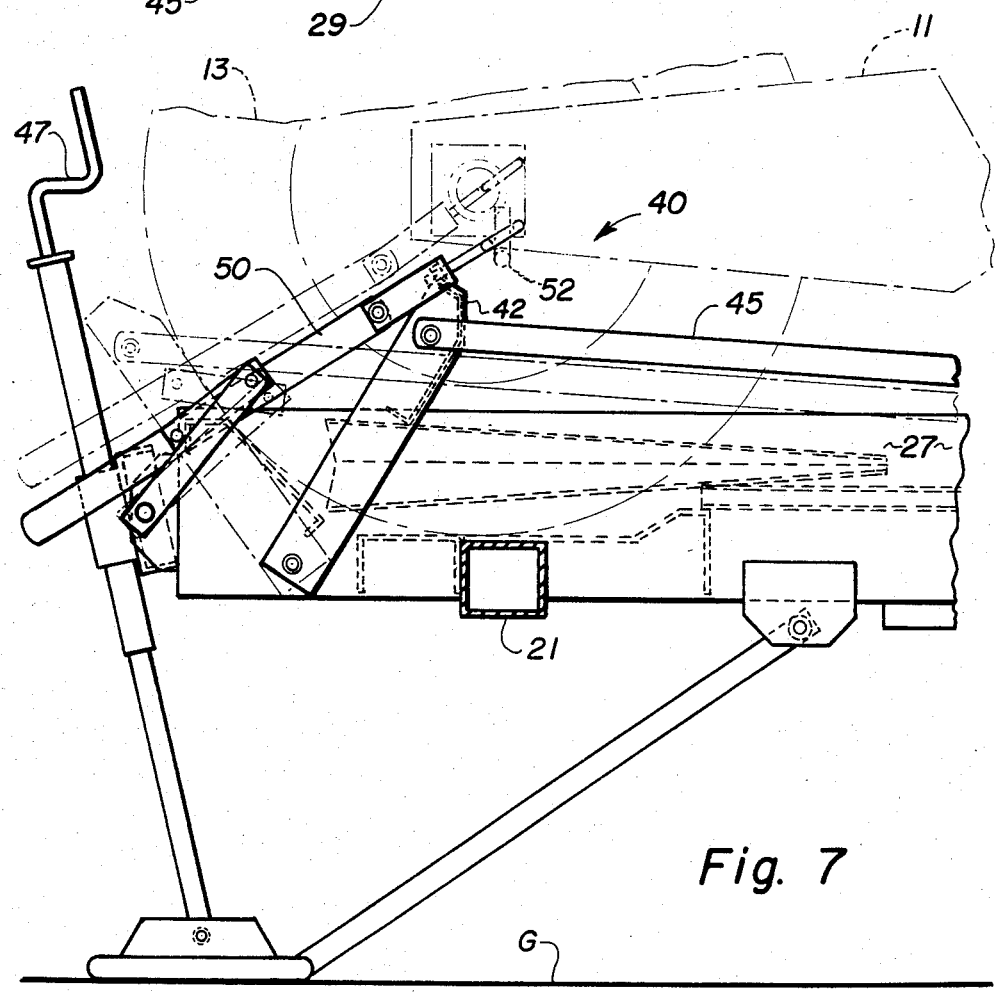
FIG. 7 is a partial cross sectional view of the lateral transport trailer taken along lines 7—7 to show an elevational view of the portion of the load platform seen in FIG. 6, the movement of the elevating linkage engageable with the harvester wheels and a overcenter latch being shown in phantom.

The elevating linkage 40 is best seen in FIGS. 5, 6 and 7. The elevating linkage 40 includes an engagement member 42 pivotally mounted on each member 27 of the load platform 25 along the transverse end 29 opposite the end 28 connected to the ramps 30. The engaging member 42 is positioned for generally horizontal pivotal movement in a transverse direction, as shown in phantom in FIG. 5. Each upper portion 33 of the elevating ramps 30 is equipped with a connection tab 44 projecting upwardly therefrom. A connecting link 45 pivotally interconnects the engaging member 42 and the mounting tab 44 to transfer pivotal movement of the engagement member 42 to the upper portion 33 of the elevating ramps 30. As shown in phantom in FIG. 5, the pivotal movement of the engaging member 42 toward the end 29 of the platform members 27 affects a pivotal movement of the upper portion 33 of the elevating ramps 30 from a ground engaging position seen in solid lines in FIG. 5 to a transport position shown in phantom in FIG. 5. After a positioning of the ramps 30 into the transport position, the articulated lower portion 34 can be swung downwardly about its articulation axis 36 to compactly minimize the transport width of the loaded trailer.

Stabilization of the two wheeled trailer 20 shown in the drawings, when the trailer is positioned to receive a harvester 10, is provided by a jack 47 and/or ground engaging members 49 forming a part of the upper portion 33 of each elevating ramp 30. Once the harvester 10 has been loaded onto the platform 25 of the trailer 20, stabilization is provided through the hitching of the drawbar 15 to the prime mover P.

In operation, the trailer is positioned as shown in FIGS. 1 and 2 with the elevating ramps 30 lowered into their ground engaging position to receive the wheels 13 of a harvester 10 to be loaded thereon. The operator manipulates the prime mover to back the harvester 10 onto the elevating ramps 30 until the harvester is elevated onto the members 27 of the load platform 25. Once the wheels 13 of the harvester 10 approach the end 29 of the members 27, the wheels 13 engage the engaging members 42 to cause a pivotal movement thereof as the harvester 10 is moved fully toward the end 29 of the members 27. As seen in FIGS. 3, 4, 5 and 7, the pivotal movement of the engaging member 42 transfers the pivotal motion through the connecting link 45 to the upper portion 33 of each elevating ramp 30 to pivotally move the ramps onto their transport position.

Figure 3:
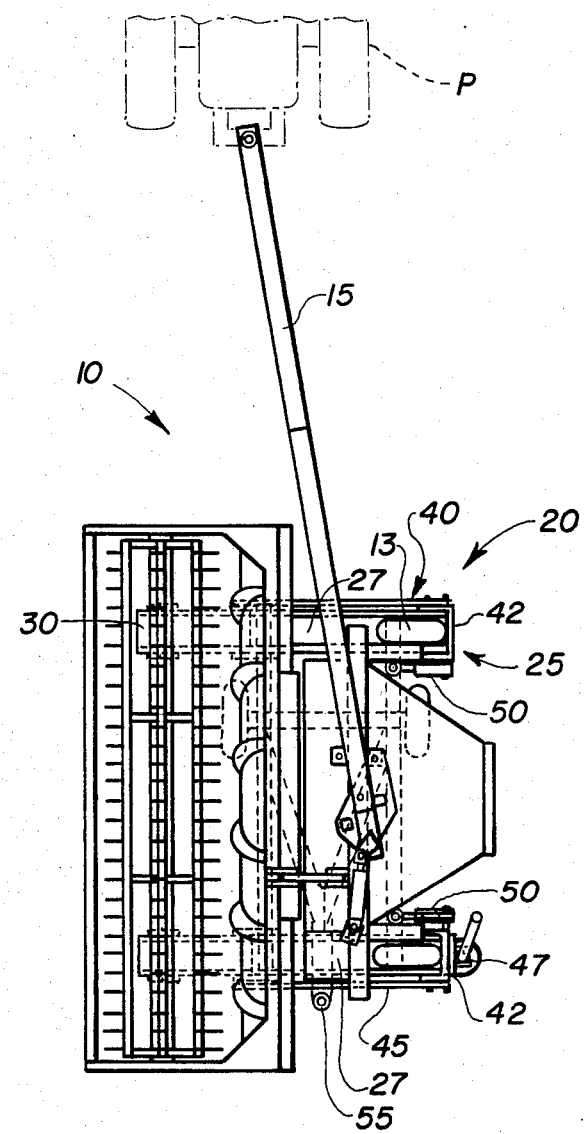
FIG. 3 is a top plan view of the transport trailer having the harvesting machine loaded thereon, the prime mover being positioned transversely of the harvester to affect a transport of the loaded trailer in a lateral orientation.

After relocating the prime mover in a laterally extending orientation relative to the harvester 10, as shown in FIG. 3, a subsequent manipulation of the locking mechanism 38 to permit the lower portion 34 of the ramps 30 to swing downwardly into their compact position and a manipulation of the jack 47 to raise it in a conventional manner, the loaded trailer 20 is ready for transport over the highway. As best seen in FIGS. 3, 5, 6 and 7, a overcenter latch 50 is provided at the end 29 of the platform members 27 to engage a special bracket 52 affixed to the frame 11 of the harvester 10 to secure the harvester 10 in position on the trailer 20. To permit transport of the trailer 20 without the harvester 10 being loaded thereon, the frame 21 is equipped with a short hitch 55 connectable to a prime mover.

It will be understood that changes in the details, materials, steps and arrangements of parts, which have been described and illustrated to explain the nature of the invention will occur to and may be made by those skilled in the art upon a reading of this disclosure within the principles of the scope of the invention. The foregoing description illustrates the preferred embodiment of the invention; however, concepts, as based upon the description may be employed in other embodiments without departing from the scope of the invention. Accordingly, the following claims are intended to protect the invention broadly, as well as in the specific form shown.

Having thus described in invention, what is claimed is:

1. A trailer for transporting a wheeled harvester comprising:
    a wheeled frame for mobile movement of said trailer over the ground along a direction of travel;
    a platform supported by said frame at a position elevated above the ground;

ramp means pivotally connected to said platform and movable in a plane substantially perpendicular to said direction of travel between a ground engaging position and an elevated position, said ramp means permitting said wheeled harvester to be transported from the ground to said platform when in said ground engaging position, said ramp means including a pair of ramp members pivotally connected to said platform and movable in corresponding planes perpendicular to said direction of travel, each said ramp member supporting a corresponding wheel of said wheeled harvester; and elevating means supported on said platform and connected with said ramp means to be engageable with said wheeled harvester to cause a movement of said ramp means from said ground engaging position to said elevated position when said wheeled harvester has been elevated onto said platform, said elevating means including an engaging member pivotally mounted on said platform and positioned to be engageable with the harvester to effect pivotal movement thereof, said elevating means further including a connecting link interconnecting said engaging member and said ramp members to transfer pivotal movement from said engaging member to said ramp members to raise said ramp members from said ground engaging position to said elevated position.

2. The trailer of claim 1 wherein said platform includes a pair of spaced apart members adapted to receive and support the wheels of said wheeled harvester.

3. The trailer of claim 2 wherein one of said ramp members is pivotally connected to a corresponding platform member, each said platform member being provided with an engaging member and a connecting link interconnecting the corresponding engaging members and ramp members.

4. The trailer of claim 3 wherein each said ramp member includes an upper portion and an articulated lower portion movable relative to said upper portion when said ramp member is moved into said elevated position.

* * * * *